United States Patent [19]
Hosoe et al.

[11] 3,950,764
[45] Apr. 13, 1976

[54] SYSTEM FOR AUTOMATICALLY FOCUSING AN OBJECT IN A CAMERA OR THE LIKE

[75] Inventors: Kazuya Hosoe, Machida; Seiichi Matsumoto, Tokyo; Noritaka Mochizuki, Kamakura, all of Japan

[73] Assignee: Canon Kabushiki Kaisha, Tokyo, Japan

[22] Filed: May 20, 1974

[21] Appl. No.: 471,708

Related U.S. Application Data
[63] Continuation of Ser. No. 294,931, Oct. 4, 1972, abandoned.

[30] Foreign Application Priority Data
Oct. 8, 1971 Japan............... 46-79228

[52] U.S. Cl. ............................. 354/25
[51] Int. Cl.² ................... G03B 3/10; G03B 3/02
[58] Field of Search ...... 354/25, 163, 165; 352/140; 353/101; 356/122, 4, 5

[56] References Cited
UNITED STATES PATENTS

| | | |
|---|---|---|
| 3,180,218 | 4/1965 | Durst............................. 354/59 X |
| 3,367,254 | 2/1968 | Townsley....................... 354/163 |
| 3,450,018 | 6/1969 | John, Jr. ........................ 354/25 |
| 3,511,155 | 5/1970 | Yamada......................... 354/25 |
| 3,555,280 | 1/1971 | Richards, Jr. ................. 356/126 |
| 3,596,101 | 7/1971 | Semeya et al................. 352/140 |
| 3,615,137 | 10/1971 | Yamaguchi et al........... 356/122 |
| 3,623,811 | 11/1971 | Lederer ........................ 356/4 |
| 3,678,826 | 6/1971 | Mori et al..................... 354/51 |
| 3,688,673 | 9/1972 | Katsuyama.................... 354/25 |
| 3,720,151 | 3/1973 | Katsuyama.................... 354/25 |

*Primary Examiner*—L. T. Hix
*Assistant Examiner*—E. M. O'Connor
*Attorney, Agent, or Firm*—Fitzpatrick, Cella, Harper & Scinto

[57] ABSTRACT

An automatic focusing system which includes a cylindrical image forming lens disposed in opposed relationship with a photocell. The cell and the cylindrical lens are ring-shaped so that the representation characteristic of the cylindrical lens for an object and the light reception characteristic of the photocell cooperate together to detect any pattern of object in accordance with an extreme output value of the photocell.

6 Claims, 20 Drawing Figures

SYSTEM FOR AUTOMATICALLY FOCUSING AN OBJECT IN A CAMERA OR THE LIKE

This is a continuation of Ser. No. 294,931, filed Oct. 4, 1972, now abandoned.

BACKGROUND OF THE INVENTION

1. Field of the Invention

This invention relates to a system for automatically focusing an object in a camera or the like, and more particularly to an automatic focusing system which is capable of achieving automatic focusing independently of the pattern of the object.

2. Description of the Prior Art

U.S. Pat. No. 3,615,137 discloses an automatic focusing system whereby the focused condition of an object image may be detected by an extreme value which is presented by a photocell when the object image focused on the photocell is of the highest contrast or the clearest. With such a known system, the object may be automatically focused by either associating a photographic lens with the image forming lens for the photocell or associating a photographic lens with a stationary cell with the image forming lens for the photocell and stopping the photographic lens when the cell presents an extreme value. However, since the photocell was generally provided with comb-like or parallel electrodes oriented in one direction, automatic focusing operation could not be attained for every pattern of object. For example, where an object consists of a pattern of parallel stripes perpendicular to the electrodes on the cell or where a striped pattern image is projected on the cell to thereby form a striped pattern of the object in parallel to the direction of a current flowing between the electrodes, the cell has no detection power for the clearness of the formed object image. Where the striped pattern of the object is perpendicular to the direction of flow of the current, the cell has its maximum detection power. Thus, the conventional system could not detect the clearness of the formed image with a very high accuracy for every pattern of object.

However, since usual objects rarely consist of simple striped patterns but often consist of a composite of various patterns, a photocell provided with uni-oriented electrodes is not always incapable of automatic focus detection, although such a photocell is very much limited in its detection power for the clearness of the formed image and thus unsuitable for practical purposes.

SUMMARY OF THE INVENTION

It is the object of the present invention to overcome the above-noted disadvantages peculiar to the prior art and to enable automatic focusing with a maximum sensitivity to be accomplished for any pattern of object. According to the present invention, this may be achieved by causing a cylindrical lens to impart a directivity to the representation characteristic of the photographic optical system for photocell, i.e. to the magnification at which the distance between any two points in an object space is represented in an image space through the optical system, or by imparting a directivity to the electrode structures of the photocell, the cylindrical lens and the photocell being both stationary or rotatable relative to each other.

BRIEF DESCRIPTION OF THE DRAWINGS

The invention will become fully apparent from the following detailed description thereof taken in conjunction with the accompanying drawings, in which:

FIG. 4 is a block diagram of an electric circuit suitable for the automatic focusing device of FIG. 2a.

DESCRIPTION OF THE PREFERRED EMBODIMENTS

Figure 1A:
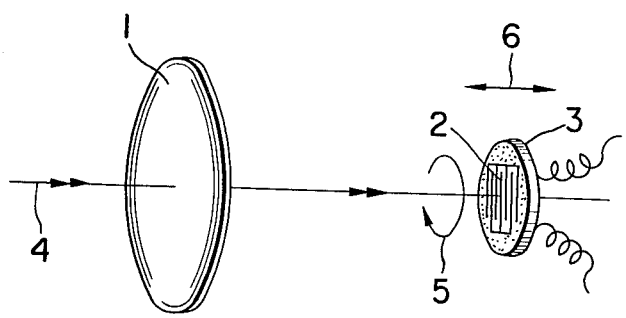
FIG. 1a to 1d illustratively show four examples of the arrangement for realizing a cooperative relationship between the representation characteristic of the optical system and the light reception characteristic of the photocell.

Referring to FIG. 1a, there is shown an ordinary lens 1 and a photocell 3 provided with electrodes 2. The photocell 3 is disposed on the optical axis 4 of the lens 1 and is rotatable in the direction of arrow 5 or in the opposite direction while vibrating in the directions of double-headed arrow 6. Since the photocell 3 is rotatable as well as vibratory along the optical axis with respect to an image of an object formed by the lens 1, the photocell can sensitively detect at least one position of angular rotation at which the formed object image is the clearest due to the correlation between the construction of the electrodes and the variable brightness distribution in the object. More specifically, in case of a striped object, for example, this holds true because the detection power of the photocell for the clearness of the formed object image is greater when the direction of the stripes of the object is perpendicular to the direction of the photocurrent flowing between the two electrodes of the photocell and is smaller when the photocurrent flows parallel to the stripes of the object. This also holds true where the object is of more complicated configuration.

Figure 1B:
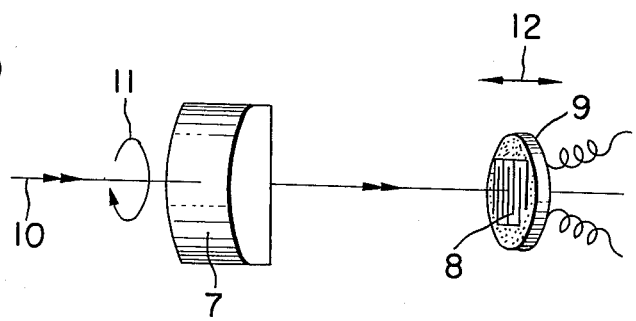

Referring now to FIG. 1b, there is shown a cylindrical lens 7 which is capable of forming an image in a specific direction, and a photocell 9 havng electrodes 8 and disposed on the optical axis 10 of the lens 7. The cylindrical lens 7 is rotatable in the direction of arrow 11 or in the opposite direction and in a plane perpendicular to the optical axis 10 while the photocell 9 is vibratory in the directions of double-headed arrow 12. Because of its representation characteristic, the cylindrical lens functions to form the clearest image when its image forming direction is coincident with the configuration of an object, and it is thus apparent that the arrangement of FIG. 1b is similar in effect to that of FIG. 1a owing to the coaction between the photocell 9 and the electrodes 8.

Figure 1C:
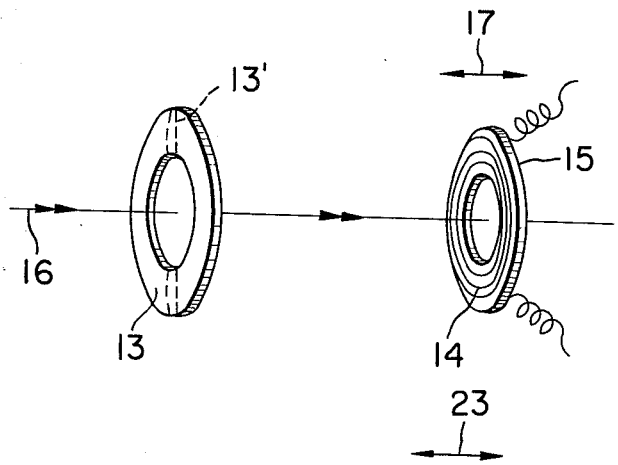

FIG. 1c shows a ring-shaped cylindrical lens 13 having a cross section 13' and a ring-shaped photocell 15 having a concentric electrode 14 and disposed coaxially with the center 16 of the ring-shaped cylindrical lens 13. The photocell 15 is vibratory in the directions of double-headed arrow 17. Since the ring-shaped cylindrical lens has an annular image-forming direction as is well known, it can form an annular image irrespective of the brightness distribution in the object. Therefore, the direction of the formed object image (annular direction) and the direction of flow of the photocurrent are always perpendicular to each other owing to the relation with the concentric electrode 14 of the photocell 15, whereby the focused condition of the formed object image can be sensitively detected.

Figure 1D:
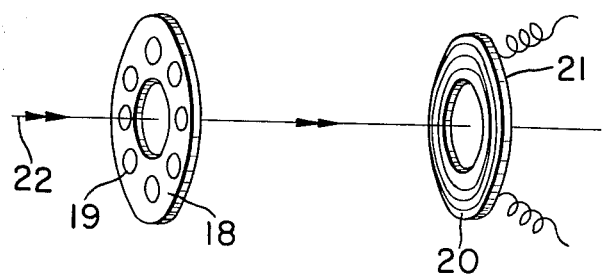

FIG. 1d shows a ring 18 having miniature lenses 19 disposed circumferentially thereof in equally spaced-apart relationship, and a photocell 21 provided with a concentric electrode 20. The ring 18 and the element 21 are disposed on a common axis 22, and the photocell 21 is vibratory in the directions of double-headed arrow 23. Each of the miniature lenses 19 can form an image of an object on the photocell 21. During such image formation, regardless of the variable brightness distribution in the object, there may be provided at least one point at which the clearness of the formed object image can be sensitively detected due to an effect provided by the concentric electrode 20 of the photocell 21 which is similar to the effect already described.

The foregoing four examples show basic possible arrangements for sensitively detecting the clearness of an object image formed by an optical system for any brightness distribution in the object other than a surface of uniform brightness. It will be apparent from these arrangements that the described effect may be achieved by the coaction between the representation characteristic of the optical system and the light reception characteristic of the photocell.

Figure 2A:
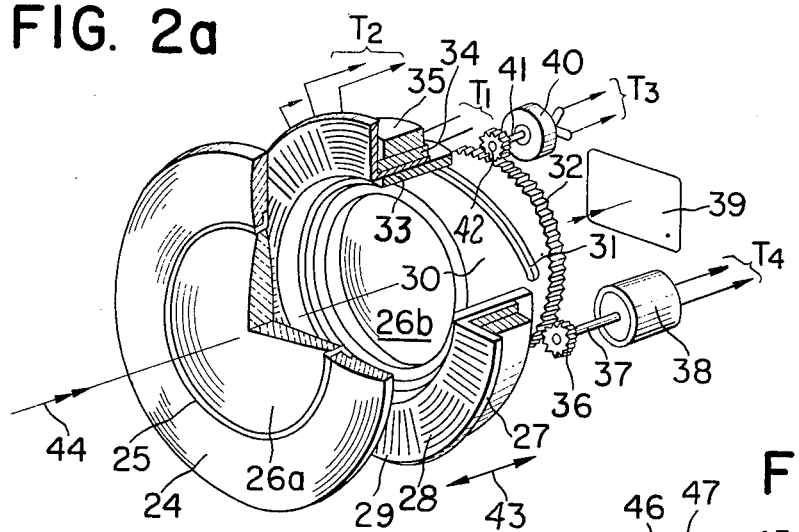
FIG. 2a shows an embodiment of the automatic focusing device using the optical system and photocell shown in FIG. 1c.

Referring to FIG. 2a, there is shown an embodiment of the mechanism in an automatic focusing device utilizing the combination of an optical system and a photocell as shown in FIG. 1c. Numeral 24 designates the ring-shaped cylindrical lens securely mounted concentrically on a part 26a of the photographic optical system by means of a frame 25. Near the focal point of the ring-shaped lens 24 there is provided a photocell which comprises a base plate 27 smoothly slidably connected at a portion to an annular slide member 33, the base plate 27 being coated with a photoelectric material, and a plurality of electrode structures 28 forming an element for detecting the focused condition of an object image and a plurality of electrode structures 29 forming a correction element, the electrode structures 28 and 29 being alternately disposed on the base plate 27 circumferentially thereof. Around the connecting portion between the base plate 27 and the annular slide member 33, there is mounted a coil 34 for vibrating the photocell at a suitable frequency in the directions of double-headed arrow 43, which is parallel to the optical axis 44, due to the coaction between the coil and an annular magnet 35 disposed outwardly thereof. The coil 34 has a terminal $T_1$, through which electric current in the form of, for example, sinusoidal waves, etc., is supplied thereto from an oscillating circuit (O, FIG. 4). Depending on the variations in the electric current flowing through the coil 34, there is created an electromagnetic force between the coil 34 and the magnet 35, by which the coil 34 and the base plate 27, on which the coil 34 is mounted, are displaced in a direction controlled by the annular slide member 33, i.e. in the direction of the optical axis of the annular lens 24. Accordingly, when the electric current supplied to the terminal $T_1$ is varied by a predetermined frequency, it is possible to vibrate the coil 34 and the base plate 27 in the direction of the optical axis of the annular lens 24 at a predetermined frequency, whereby the photocell is vibrated. This is the same principle as the voice coil in a dynamic speaker. Another part 26b of the photographic optical system is secured by and within a body tube 30, which is partly formed with a grooved cam 31 for permitting the photographic optical system 26 to move with respect to a film surface 39. The grooved cam 31 is engaged by a pin not shown provided in the inner surface of the annular slide member 33. At one end of the body tube 30, there is securely mounted a gear 32 for receiving a driving force transmitted from a servomotor 38 via shaft 37 and pinion 36. On the other hand, the gear 32 is engaged with a pinion 42 in such a relationship as to impart rotation to a potentiometer 40 via the pinion 42 and shaft 41 in order to supply an electric circuit, described later, with the information representating the position of the photographic optical system at any desired time.

Figure 2B:
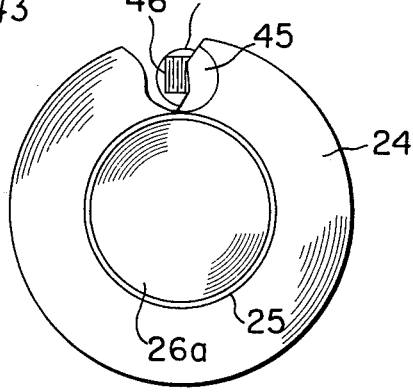
FIG. 2b shows a form of the assembly of a light receiving optical system and light receiving element for ordinary automatic aperture device.

FIG. 2b shows an arrangement in which a circumferential part of the ring-shaped cylindrical lens 24 in the device of FIG. 2a forms an optical system for concentrating the light from an object into a photocell used for the ordinary automatic stop-down. Behind the optical system 45 is disposed a photocell 47 having an electrode 46.

Figure 3A:
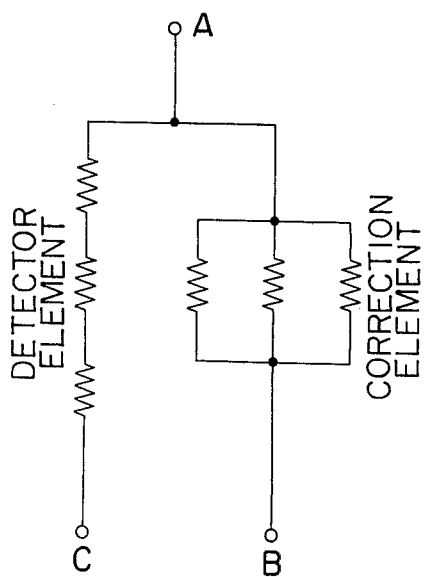
FIG. 3a shows an example of the electrode structure of the photocell suited for the present invention.
Figure 3B:
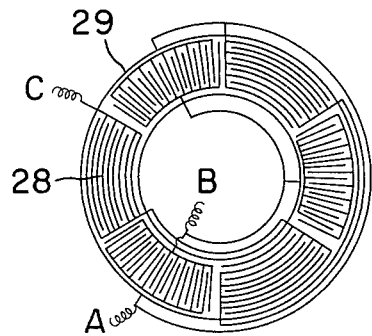
FIG. 3b shows an example of the electrical connection in the photocell.
Figure 3C:
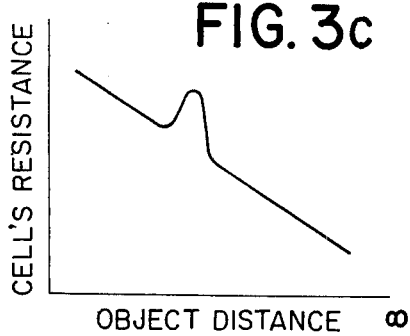
FIG. 3c and 3d show the output waveforms produced by the detector element for detecting the focused condition of the object image and by the correction element in accordance with the periodical variation in the relative distance between the optical system and the photocell.
Figure 3D:
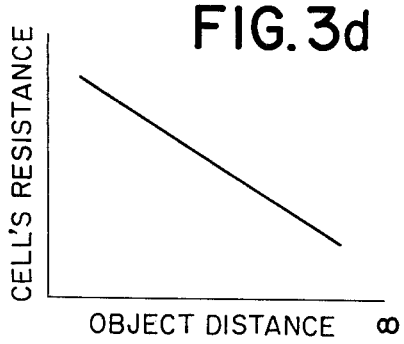

FIG. 3a particularly illustrates the construction of the photocell used in the arrangement of FIG. 2a. This figure shows a form of the photocell whose light-receiving portion is divided into six sectors, which alternately provide elements 28 each comprising a concentrically formed electrode structure for detecting the focused condition of the formed object image (hereinafter referred to as "detector elements"), and correction elements 29 each comprising a radially formed electrode structure. As already described, the object image formed by a ring-shaped cylindrical lens is substantially annular so that the portion of the photocell which is provided with the concentric electrode structure is sensitive to the variation in the clearness of the formed object image because the directions of such image and the photocurrent are perpendicular to each other. Therefore, as shown in FIG. 3c, the photocell at a position thereof corresponding to the object distance presents an obviously extreme resistance value. On the other hand, in the portion of the photocell which is provided with the radially disposed electrode structure, the directions of the formed object image and the photocurrent are parallel to each other and therefore, as shown in FIG. 3d, the photocell presents no extreme resistance value which corresponds to the condition under which the formed object image is the clearest, but a variation in the amount of the light impinging on the photocell only occurs as the result of the variation in the distance between the optical system and the photocell. The variation in the resistance value shown in FIG. 3c is also the result of the variation in the amount of the incident light.

In FIG. 3a, the number of divisions in the light receiving surface should desirably be twice an odd number. The reason is that since the image formed by the ring-shaped cylindrical lens is more clearly formed at two right and left symmetrical positions on the photocell than anywhere else, in accordance with the brightness distribution in the object, the detection of the formed image condition will be infeasible or at least much less accurate if correction elements occupy such two symmetrical positions on the photocell. Also, more effectively, the detector elements should be serially connected together while the correction elements should be parallel-connected together as shown in FIG. 3b. This is because an extreme resistance value produced by any one of the serially connected detector elements will sensitively present itself as an overall resistance value due to the serial connection characteristic, whereas the extreme resistance value provided by any one of the correction elements will only involve a very slight variation in the overall resistance value.

In the described construction of the photocell, it will be apparent that the divisions need not be uniform and the number of the divisions may be increased and that the electrode structures are not limited to the shown configurations.

Figure 4:
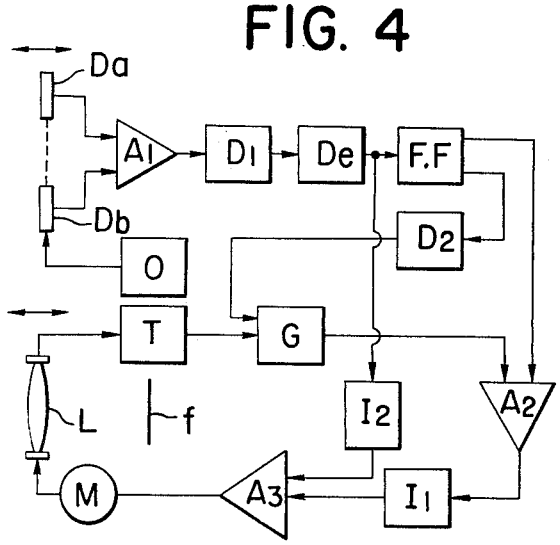

FIG. 4 is a block diagram of the electric circuit in the device described above with respect to FIGS. 2a and 3a. Da and Db respectively correspond to the detector element and the correction element shown in FIGS. 2a and 3a. These elements receive, via the opposite terminal of the coil 34 in FIG. 2a, a signal from a low frequency oscillator O which produces a frequency of the order of several Hz, for example, whereupon they effect low-frequency vibrations in the directions of double-headed arrow at an amplitude corresponding to the distance containing the image plane of the object extremely close to the focal point of the ring-shaped cylindrical lens 24.

Figure 5A:
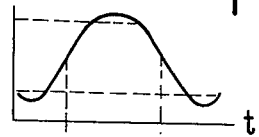
FIGS. 5a - 5i illustrate variations with time in the signal waveforms produced at various parts of the FIG. 4 circuit.

Since variations in the resistance values of the detector and correction elements are such as shown in FIGS. 3c and d, the above-described vibrations of these elements produce peculiar output waveforms as shown in FIGS. 5a - 5i, where the horizontal axes represent the lapse of the same period of time and the vertical axes, except that in FIG. 5a, represent any desired unit. FIG. 5a shows the mode of vibrations of the photocell in which vibrations occurs over a distance containing the focal planes of the optical system for an object at infinity to a closest object.

Figure 5B:
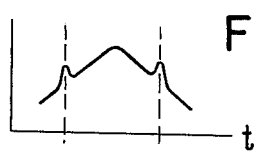
Figure 5C:
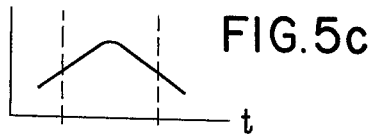
Figure 5D:
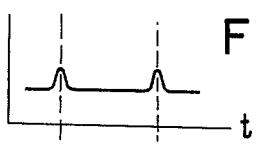
Figure 5E:
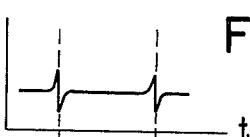
Figure 5F:
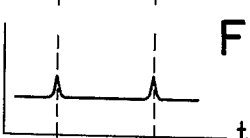
Figure 5G:
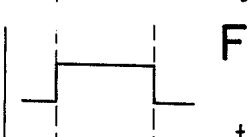
Figure 5H:
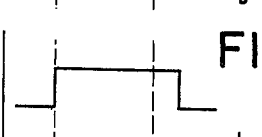
Figure 5I:
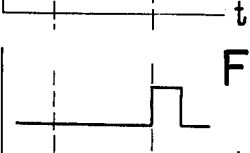

The vertical broken lines represent the focal planes of the optical system for the closest object and for the object at infinity, respectively. FIGS. 5b and c show the output waveforms of the detector element and correction element, respectively. The outputs of the photocell are supplied from three terminals T2 (FIG. 2a) to a differential amplifier A1 (FIG. 4). The differential amplifier A1 produces an output representing the difference between the outputs of the two elements, so that only an extreme resistance value of the detector element is derived as shown in FIG. 5d. This is further passed through a differentiation circuit D1 and a detection circuit De to drive a flip-flop FF. The output waveforms of the differentiation circuit D1 and detection circuit De are shown in FIGS. 5e and f, respectively. During its reciprocal stroke, the detector element twice passes a point at which the formed object image is the clearest, thus producing a similar extreme value each time. It is apparent that the time interval between the two extreme values corresponds to the object distance at a ratio of 1 : 1 since the frequency of vibration is constant. Therefore, the width of the pulse shown in FIG. 5g which is the output from the flip-flop FF turned on and off by the two pulses at the output of the detection circuit De provides a signal corresponding to the object distance. On the other hand, the output of the potentiometer (designated at 40 in FIG. 2a) for providing the information representing the position of the photographic optical system (designated at 26 in FIG. 2a) at any desired time is supplied through the terminals T3 to a time constant setting circuit G to control the width of the pulse generated thereby. It is thus seen that the width of the output pulse of the pulse generator circuit as shown in FIG. 5h represents the position of the photographic optical system. At this stage, in order to synchronize the output pulse generation from the flip-flop FF with the output pulse generation from the pulse generator circuit to thereby facilitate a subsequent signal treatment, the output pulse of the flip-flop may be differentiated by a differentiation circuit D2 and the pulse generator circuit G may be triggered by a positive pulse in the differentiation output. The two pulses thus generated are supplied to a differential amplifier A2. The output from this differential amplifier is a new pulse of a sign corresponding to the difference in width between the two pulses. Such new pulse represents a deviation signal corresponding to the difference between the actual object distance and the current distance to which the photographic optical system is being properly focused. The deviation signal is integrated by an integration circuit I2 and amplified by a servoamplifier A3 to rotate the servomotor M in the direction corresponding to the sign of the deviation signal. As a result, the photographic optical system L is moved forward or backward so as to ensure a clear image of the object to be formed on the film surface $f$.

The input to the servomotor M is supplied through terminals T4 (FIG. 2a). The integration circuit I2 serves to automatically adjust the gain of the servoamplifier A3 in accordance with the magnitude of the input from the object, and forms a part of the AGC circuit.

As has been described hitherto, the system of the present invention for detecting the focused condition of the object image may be utilized readily to form an automatic focusing device, which is not limited to the shown form but is applicable in various other forms. In addition, the feature of the present invention that the detection power is not affected by the brightness distribution in the object is essentially effective for the realization of the device of the described type.

Although the embodiment of FIG. 2a has been described with respect to the case as shown in FIG. 1c where the ring-shaped cylindrical lens is stationary with the photocell displaceable along the optical axis of the lens, a rectangular cylindrical lens as shown in FIG. 1b may be used instead of the ring-shaped cylindrical lens and rotated at a predetermined speed with a universally available cell 9 used as the photocell, to obtain the same result as that described above.

Thus, according to the present invention, either a stationary ring-shaped cylindrical lens or a rotatable rectangular cylindrical lens may be disposed in opposed relationship with a photocell to concentrate an object image to the target so as to form a compact pattern on the surface of the photocell, thereby detecting the focused condition in accordance with the output of either of the portions of the photocell which have the maximum detection power for the clearness of formed image. This is effective in that automatic focusing for any pattern of object can be accomplished with a high accuracy.

We claim:

1. An automatic focusing system for focusing an object image on a focal plane comprising:

an annular photocell means of photoconductive type having a light receiving surface, said photocell means having a non-linear characteristic relation between the output thereof and the intensity distribution of illumination of said object image so as to assume an extreme value thereof when the image of the object is focused on the light receiving surface;

an annular cylindrical lens disposed forwardly of the light receiving surface of the photocell, said cylindrical lens having a fixed focal length defining a focal plane;

first drive means for periodically varying the distance between said annular cylindrical lens and said photocell means;

second drive means, a phototaking lens drivingly connected to said second drive means, said phototaking lens being displaceable along the axis thereof through said second drive means;

control circuit means including an extreme value detecting circuit having the input thereof connected to said photocell means for detecting an extreme value derived when the object image is focused on the light receiving surface of said photocell means, and a drive circuit electrically connected to said second drive means, said drive circuit being associated with said detecting circuit so as to control, in accordance with the output of said detecting circuit, the cut-off of a drive current applied to said second drive means through said drive circuit;

whereby said phototaking lens is automatically focused until the extreme value of said photocell means is detected.

2. An automatic focusing system according to claim 1, wherein said annular photocell means comprises, at least one group of electrodes, said group having a plurality of electrodes which are disposed substantially parallel to each other and concentrically with said annular photocell means.

3. An automatic focusing system according to claim 2, wherein the parallel electrodes of said photocell means are separated into a plurality of sections, between which are provided auxiliary electrodes disposed substantially perpendicularly to said parallel electrodes.

4. An automatic focusing system according to claim 1, wherein said phototaking lens is disposed in the hollow of said annular photocell means.

5. An automatic focusing system according to claim 1, wherein said annular photocell means comprises, a plurality of groups of first electrodes disposed in circumferentially spaced relationship, each of said groups of first electrodes having a plurality of first electrodes disposed substantially parallel to each other and concentrically with said annular photocell means, a first portion of said first electrodes in each group having a comb-like configuration and a second portion of said first electrodes having a comb-like configuration meshed with said first portion, a plurality of groups of second electrodes disposed in circumferentially spaced relationship interposed between said groups of first electrodes, each of said groups of second electrodes having a plurality of second electrodes disposed substantially orthogonally with respect to said first electrodes, a first portion of said second electrodes in each group having a comb-like configuration and a second portion of said second electrodes having a comb-like configuration meshed with said first portion.

6. An automatic focusing system for focusing an object image on a focal plane, comprising:

a photocell comprising at least one group of electrodes, said group having a plurality of electrodes which are disposed substantially parallel to each other;

a rectangular cylindrical lens having an optical axis thereof along which said photocell is disposed backwardly of said cylindrical lens, said cylindrical lens being rotatable about the optical axis thereof;

a detection circuit for detecting the output of said photocell;

a phototaking lens, the optical axis of which is so disposed as to be in parallel with the optical axis of said cylindrical lens;

first drive means for periodically varying the distance between the cylindrical lens and the photocell, second drive means for said phototaking lens;

a drive circuit for supplying a drive current to said second drive means; and a control circuit for controlling said drive circuit in accordance with the output of said detection circuit;

whereby said detection circuit detects an extreme value produced by said photocell upon focusing of said phototaking lens to thereby de-energize said second drive means through said drive circuit and stop the movement of said phototaking lens.

* * * * *